No. 723,664. PATENTED MAR. 24, 1903.
J. M. FISCHER.
BAKER'S OVEN.
APPLICATION FILED AUG. 27, 1902.
NO MODEL. 3 SHEETS—SHEET 1.
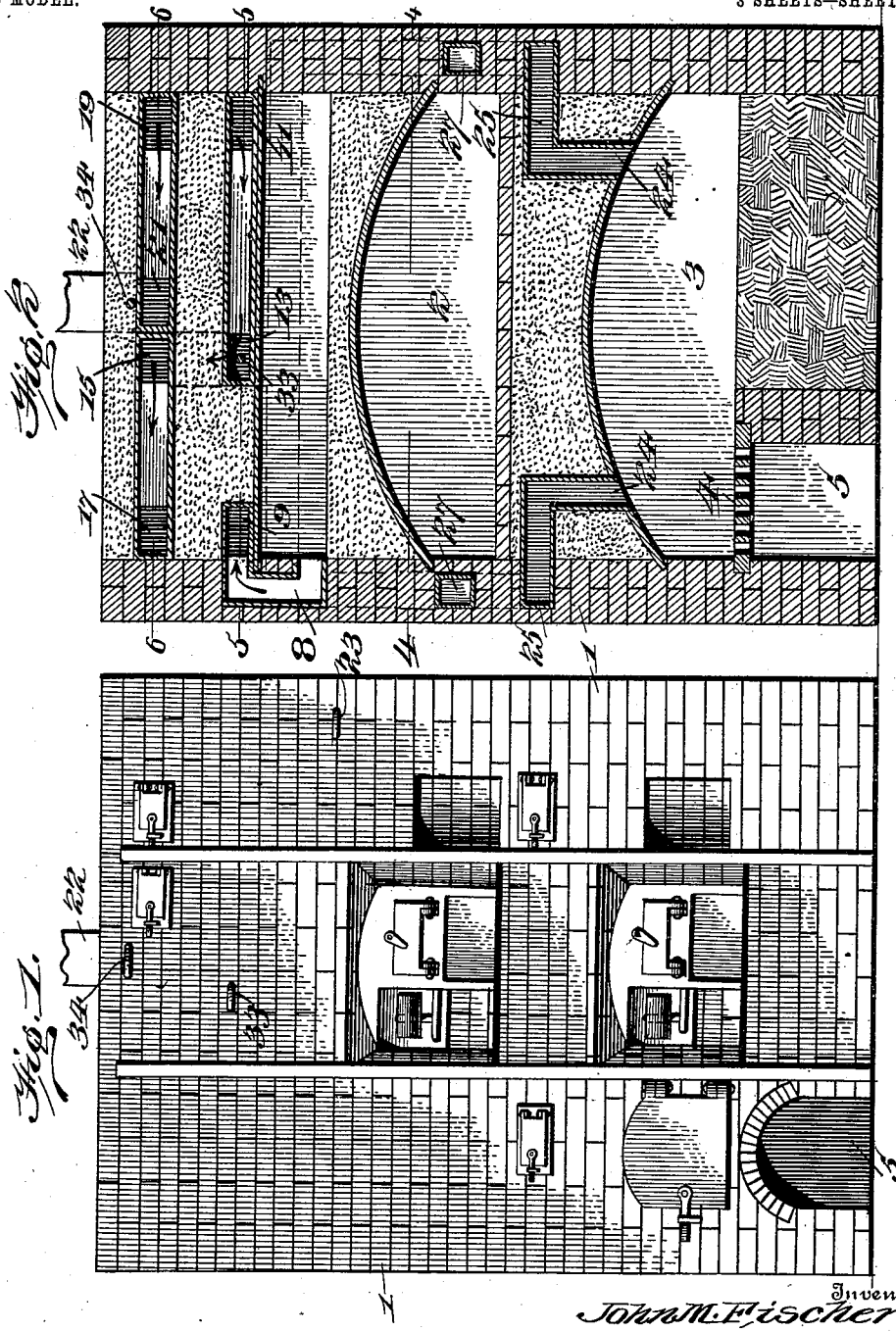
Witnesses
H. G. Dieterich
Ida Demonet
Inventor
John M. Fischer
By Knight Bros
Attorneys
THE NORRIS PETERS CO., PHOTO-LITHO., WASHINGTON, D. C.

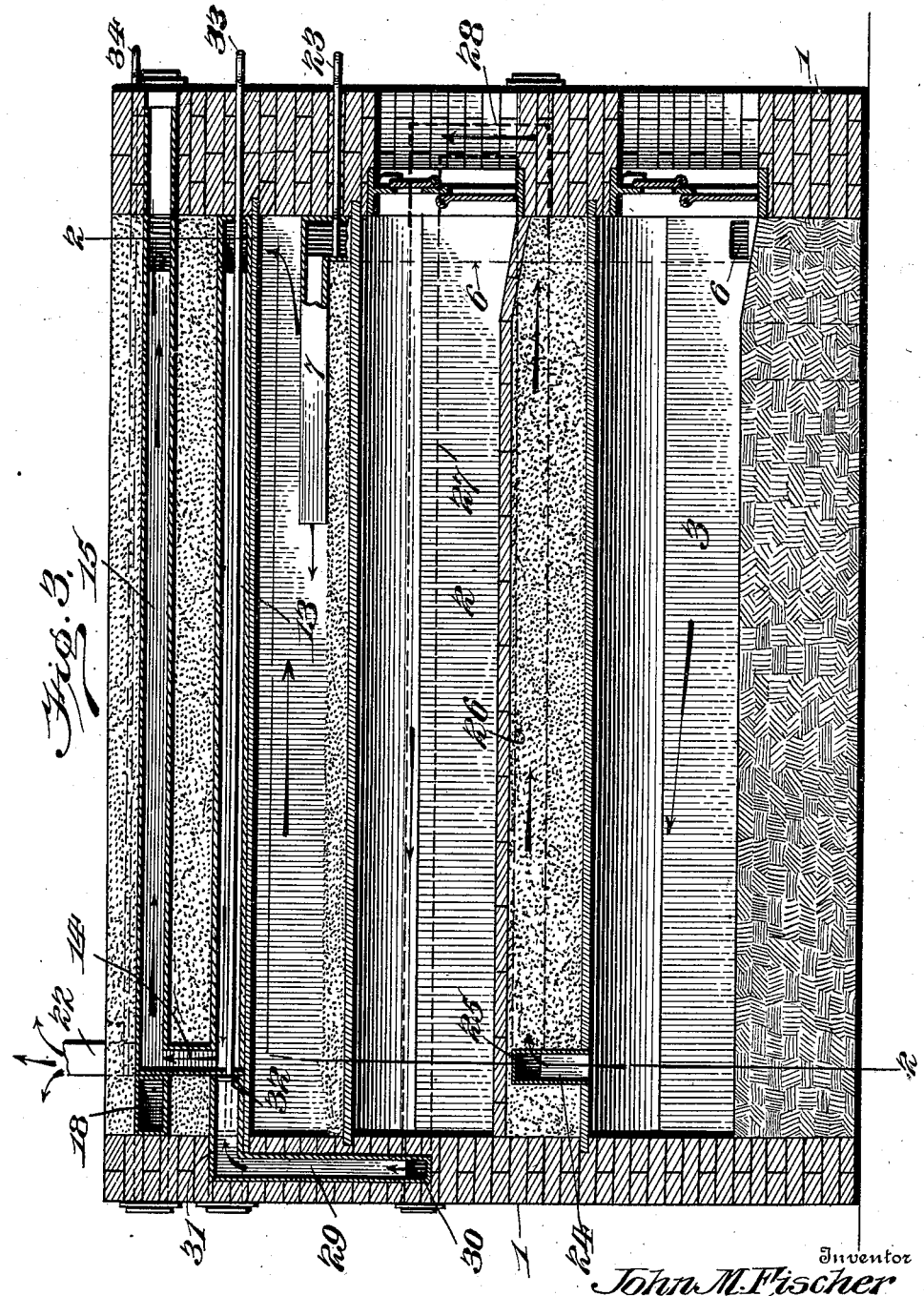

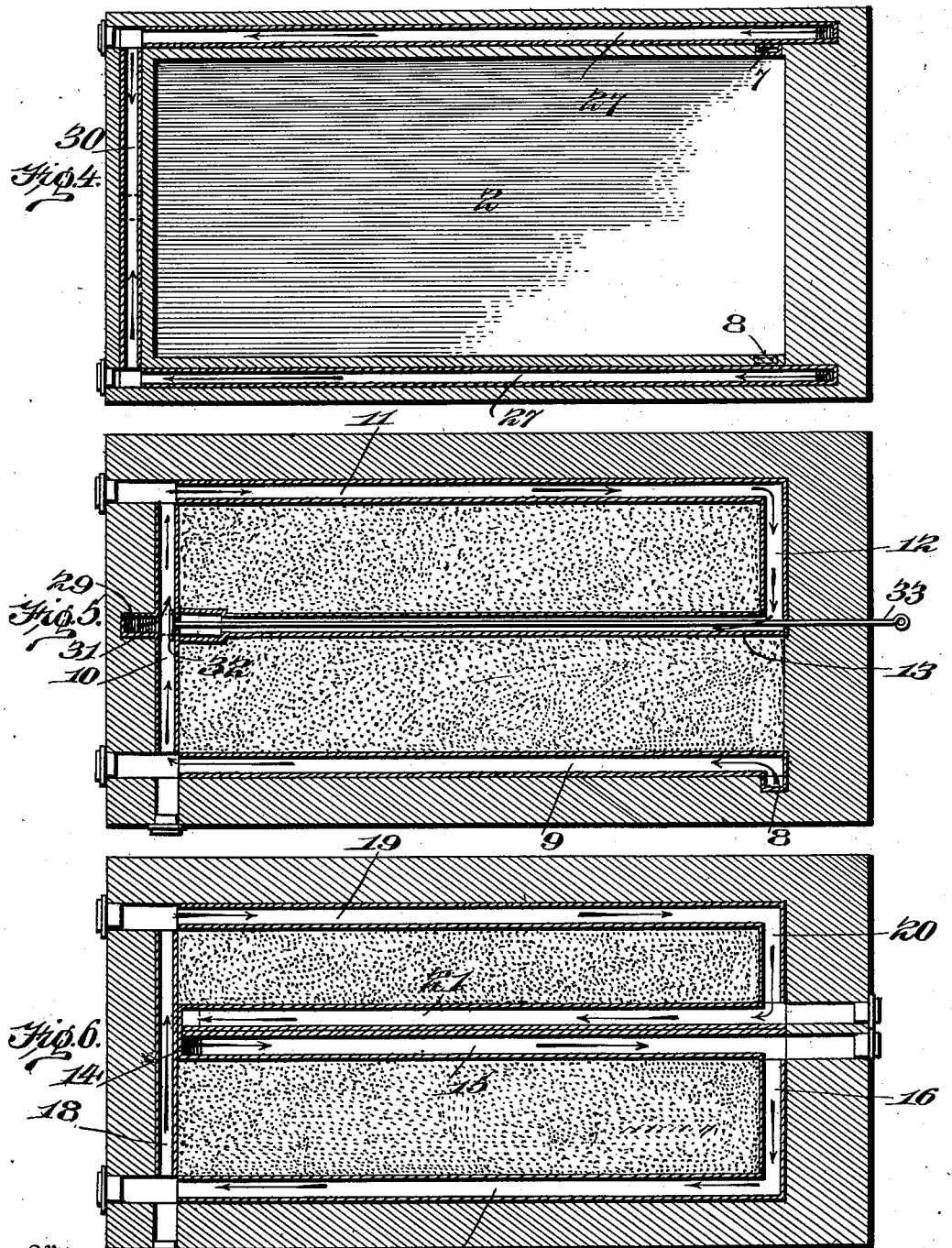

UNITED STATES PATENT OFFICE.

JOHN M. FISCHER, OF WASHINGTON, DISTRICT OF COLUMBIA.

BAKER'S OVEN.

SPECIFICATION forming part of Letters Patent No. 723,664, dated March 24, 1903.

Application filed August 27, 1902. Serial No. 121,253. (No model.)

*To all whom it may concern:*

Be it known that I, JOHN M. FISCHER, a citizen of the United States, and a resident of Washington, in the District of Columbia, have invented certain new and useful Improvements in Bakers' Ovens, of which the following is a specification.

My invention relates to an improvement in bakers' ovens, and more particularly to that class shown in my former patent, No. 610,648, dated September 13, 1898.

The object of my invention is to provide means for heating the sides of the baking-space in addition to means for heating the top, as provided in my former patent.

A further object is to provide means whereby either or both of said heating means may be used, so that the heat may be regulated to evenly bake the material within the baking-space.

With these and other objects in view the invention consists of the parts and combinations of parts, as will be more fully hereinafter described, and pointed out in the appended claims.

In the drawings forming a part of this specification, Figure 1 is a front view of the oven. Fig. 2 is a section on the line 2 2 of Fig. 3. Fig. 3 is a longitudinal section. Fig. 4 is a horizontal section on the line 4 4 of Fig. 2. Fig. 5 is a horizontal section on the line 5 5 of Fig. 2, and Fig. 6 is a horizontal section on the line 6 6 of Fig. 2.

Referring more particularly to the drawings, 1 indicates the walls of the oven, which inclose the baking-space 2 and the combined combustion and baking space 3. In one corner of the combined combustion and baking space 3 is mounted a grate 4, having disposed beneath it an ash-pit 5. Extending upwardly from the lower part of the combined combustion and baking space 3 to a heat-chamber 7, located above the baking-space 2, is a flue 6. The products pass from the heat-chamber 7 through a vertical flue 8, extending upwardly a short distance from a front corner of said heat-chamber through a longitudinal flue 9 on one side of the oven to the rear of the oven, thence through a transverse flue 10 in the rear of the oven to the other side of the oven through a longitudinal flue 11, pass to and through a short transverse flue 12 in the front of the oven to a longitudinal flue 13 in the center, thence up to and through a short vertical flue 14 to a longitudinal flue 15 in the center of the oven, thence through a short transverse flue 16 in the front of the oven to a longitudinal flue 17 on one side of the oven, pass to and through a transverse flue 18 in the rear to a longitudinal flue 19 on the other side, thence through a short transverse flue 20 to a central longitudinal flue 21, and finally through the flue 22 to the atmosphere.

The construction of oven so far described is shown in my former patent heretofore mentioned, and it is to be understood that while I have shown and described this construction as my preferred manner of heating the top of the oven I do not wish to be limited to said construction, but may use any other which will accomplish the same result.

In the flue 6 I provide a damper 23 to exclude heat from the chamber 7, and consequently from the top of the baking-space 2.

To heat the baking-space 2 at its sides, two passages for the products of combustion are provided, one for each side. These passages extend by means of two vertical flues 24 from the rear of the upper wall of the combined combustion and baking space 3. Each flue 24 communicates with a transverse flue 25, extending outwardly to a longitudinal flue 26, mounted in the adjacent side wall of the oven. Each longitudinal flue 26 communicates with another longitudinal flue 27, mounted in the wall of the oven adjacent to the side of the baking-space 2, by means of a vertical flue 28 in the front wall of the oven, and both longitudinal flues 27 communicate with a vertical flue 29 in the rear wall of the oven by means of transverse flues 30. The vertical flue 29 communicates with the transverse flue 10 of the other system of flues (previously described herein and in my former patent) by means of a short flue 31. Disposed in the short flue 31 is a damper 32, by which the side-wall-heating system of the baking-space is controlled. This damper is operated by a rod 33, extending through the central longitudinal flue 13 of the other system to the front of the oven. When it is desired to control both passages simultaneously, the damper 34, mounted in the flue 22, is operated.

By the construction herein described it will be seen that perfect control may be had over the heat in the oven—that is, should the baking take place too fast in one place, top or side, by a manipulation of the dampers heat may be cut off from that place and the material evenly baked.

I desire it to be understood that I do not wish to be limited to the construction and arrangement of parts herein shown and described and that I may make various changes in proportion, form, and minor details without departing from the spirit of my invention.

What I claim as new, and desire to secure by Letters Patent, is—

1. In a baker's oven, the combination with the baking-space, and the combustion-space, of two vertical flues extending from the rear of the combustion-space, two longitudinal flues connected with the vertical flues, extending forwardly, one in each side wall of the oven, two longitudinal flues extending rearwardly, one on each side of the baking-space, two vertical flues connecting the ends of both pairs of longitudinal flues, a vertical flue at the rear of the oven, and two transverse flues connecting the rearwardly-extending longitudinal flues with said last-mentioned vertical flue.

2. The combination with the combustion-space, a baking-space, a heat-chamber above the baking-space, a flue connecting the combustion-space with the heat-chamber, and a system of flues, above the heating-chamber, of a system of flues extending from the combustion-space along the sides of the baking-space, and flues leading from the side flues to the system of flues above the heat-chamber, independently of the baking-space.

3. The combination with the combined combustion and baking space, the baking-space above the same, the heat-chamber above the baking-space, the flue connecting the combined combustion and baking space with the heat-chamber, and a system of flues above the heat-chamber, of two passages leading from the rear of the combined combustion and baking space, each along one of the sides of the baking-space, and flues leading from the side flues to the system of flues above the heat-chamber independently of the baking-space.

The foregoing specification signed this 25th day of August, 1902.

JOHN M. FISCHER.

In presence of—
HERVEY S. KNIGHT,
H. G. DIETERICH.